United States Patent
Watanabe

(10) Patent No.: US 9,018,879 B2
(45) Date of Patent: Apr. 28, 2015

(54) ELECTRIC COMPRESSOR

(75) Inventor: Yutaka Watanabe, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 185 days.

(21) Appl. No.: 13/822,768

(22) PCT Filed: Sep. 30, 2011

(86) PCT No.: PCT/JP2011/005538
§ 371 (c)(1),
(2), (4) Date: Mar. 13, 2013

(87) PCT Pub. No.: WO2012/042899
PCT Pub. Date: Apr. 5, 2012

(65) Prior Publication Data
US 2013/0175964 A1    Jul. 11, 2013

(30) Foreign Application Priority Data

Oct. 1, 2010 (JP) ................................ 2010-223760

(51) Int. Cl.
| | |
|---|---|
| G05B 5/00 | (2006.01) |
| G01K 13/00 | (2006.01) |
| F04B 49/10 | (2006.01) |
| H02P 29/00 | (2006.01) |
| F04B 39/06 | (2006.01) |

(52) U.S. Cl.
CPC ............. G01K 13/00 (2013.01); F04B 49/103 (2013.01); H02P 29/0088 (2013.01); F04B 39/06 (2013.01)

(58) Field of Classification Search
CPC .... G06F 1/206; H02P 21/0035; H02P 25/021
USPC ........... 318/472, 400.02, 722, 504, 503, 801; 417/32
See application file for complete search history.

(56) References Cited

U.S. PATENT DOCUMENTS

| | | |
|---|---|---|
| 7,174,733 B2 | 2/2007 | Oomura et al. |
| 8,459,053 B2 | 6/2013 | Pham et al. |

(Continued)

FOREIGN PATENT DOCUMENTS

| | | |
|---|---|---|
| CN | 1673638 A | 9/2005 |
| CN | 101821508 A | 9/2010 |

(Continued)

OTHER PUBLICATIONS

International Search Report for PCT/JP2011/005538 dated Dec. 20, 2011.

(Continued)

*Primary Examiner* — Karen Masih
(74) *Attorney, Agent, or Firm* — Pearne & Gordon LLP

(57) ABSTRACT

An electric compressor capable of following temperature changes of a power element even if a temperature measurement unit is disposed separately from the power element. In the electric compressor, the temperature measurement unit (34) measures the temperature of a substrate (36) on which the power element (31) is disposed. A rotational speed detection unit (35) detects the rotational speed of a motor. A control unit (33) estimates the temperature of the power element (31) on the basis of the rotational speed of the motor detected by the rotational speed detection unit (35) and the temperature measured by the temperature measurement unit (34).

5 Claims, 7 Drawing Sheets

(56) References Cited

U.S. PATENT DOCUMENTS

| | | |
|---|---|---|
| 2005/0210897 A1 | 9/2005 | Oomura et al. |
| 2009/0041598 A1* | 2/2009 | Saito et al. ............... 417/410.1 |
| 2009/0090118 A1 | 4/2009 | Pham et al. |
| 2012/0201699 A1* | 8/2012 | Kim et al. .................. 417/372 |
| 2013/0240043 A1 | 9/2013 | Pham et al. |

FOREIGN PATENT DOCUMENTS

| | | |
|---|---|---|
| JP | 11-262241 A | 9/1999 |
| JP | 2000-083383 A | 3/2000 |
| JP | 2006-157987 A | 6/2006 |
| JP | 2007-092636 A | 4/2007 |
| JP | 2007-198230 A | 8/2007 |

OTHER PUBLICATIONS

Chen, Guansheng et al., "The Experiment Research of Air Condition Compressor of Electric Automobile", Jun. 10, 2006, pp. 11 to 14, vol. 17 No. 2.

English Translation of Chinese Search Report for Application No. 201180046834.0 dated Sep. 17, 2014.

* cited by examiner

ELECTRIC COMPRESSOR

TECHNICAL FIELD

The present invention relates to an electric compressor to compress a refrigerant.

BACKGROUND ART

In recent gears, electric vehicles and hybrid vehicles have been drawing attention for the realization of a low-carbon society. As a compressor for performing the cooling of the vehicle interior in such electric vehicles and hybrid vehicles, a compressor to compress the refrigerant with the driving force of electric motor (hereinafter, referred to as an "electric compressor") is mounted instead of a compressor to compress the refrigerant with the driving force of the engine up to that point of time.

If a high-load operating state continues in this electric compressor, a motor or a power element for supplying electric power to drive a motor is overheated. This may cause deterioration of characteristics, and the motor or the power element may be damaged. For this reason, it is necessary to detect the temperature of the motor, the temperature of the power element, the discharge temperature of refrigerant, and the like and to stop the electric compressor or restrict the operation when these temperatures exceed a threshold value.

There is a conventional electric compressor in which a thermistor to directly measure the temperature of a power element is disposed in the power element and the discharge temperature of the refrigerant is estimated on the basis of the measured power element temperature, the rotational speed of the motor, and motor phase current and voltage (for example, PTL 1). By stopping the power element when the estimated discharge temperature of the refrigerant becomes equal to or higher than a predetermined temperature (hereinafter, referred to as a "power element overheat protection operation"), it is possible to perform overheat protection of the power element.

CITATION LIST

Patent Literature

PTL 1
Japanese Patent Application Laid-Open No. 2007-198230

SUMMARY OF INVENTION

Technical Problem

In the conventional electric compressor, the thermistor which is a temperature measurement section to directly measure the temperature of the power element has been disposed in the power element. According to this configuration, since the thermal resistance from the heat source (power element) to the thermistor (temperature measurement section) is sufficiently small, the temperature measured by the temperature measurement section is approximately equal to the temperature of the power element.

In the conventional electric compressor, the degree of freedom in component arrangement is reduced since it is necessary to dispose the temperature measurement section directly in the power element. Disposing the temperature measurement section away from the power element is desirable since the degree of freedom in component arrangement becomes high.

However, there are the following problems, for example when the temperature measurement section is disposed on substrate away from the power element without disposing the temperature measurement section directly in the power element.

Usually, the power element is disposed near the casing surrounding the refrigerant in order to release the self-heating by heat exchange with the refrigerant. For this reason, the temperature of the power element itself is affected by the amount of heat of the refrigerant through the casing.

When the temperature measurement section is directly disposed in the power element, the power element and the temperature measurement section are equally affected by the refrigerant. Accordingly, the temperature measured by the temperature measurement section is almost the temperature of the power element itself.

On the other hand, when the temperature measurement section is disposed away from the power element, the power element and the temperature measurement section are affected differently by the refrigerant. As a result, since the influence of the amount of heat emitted by the power element of the temperature measured by the temperature measurement section becomes indeterminate, the temperature measured by the temperature measurement section becomes different from the temperature of the power element itself.

In such an arrangement, if a power overheat protection operation is performed on the basis of the temperature measured by the temperature measurement section, it is not possible to follow an abrupt increase in the temperature of the power element due to this indeterminacy. As a result, the characteristics of the power element may be deteriorated, or the power element may be damaged.

The present invention has been made in order to solve the problem in the related art, and it is an object of the present invention to provide an electric compressor capable of following the change in temperature of a power element even if a temperature measurement section is disposed away from the power element.

Solution to Problem

An electric compressor according to an aspect of the present invention includes: a motor that generates a driving force to compress a refrigerant; a power element that drives the motor; a temperature measurement section that measures a temperature of a substrate on which the power element is disposed; a rotational speed detection section that detects the rotational speed of the motor; and a control section that estimates a temperature of the power element. The control section estimates the temperature of the power element on the basis of the rotational speed of the motor detected by the rotational speed detection section and the temperature measured by the temperature measurement section.

Advantageous Effects of Invention

The present invention estimates the temperature of the power element on the basis of the rotational speed of the motor detected by the rotational speed detection section and the temperature measured by the temperature measurement section. The rotational speed of the motor is directly related to the flow rate of the refrigerant. Therefore, the influence of the refrigerant can be reduced by correcting the temperature measured by the temperature measurement section with the rotational speed of the motor detected by the rotational speed detection section.

From the above, there is an effect that the temperature measurement section can follow the change in temperature of the power element even if the temperature measurement section is disposed away from the power element.

DESCRIPTION OF EMBODIMENTS

Figure 1:
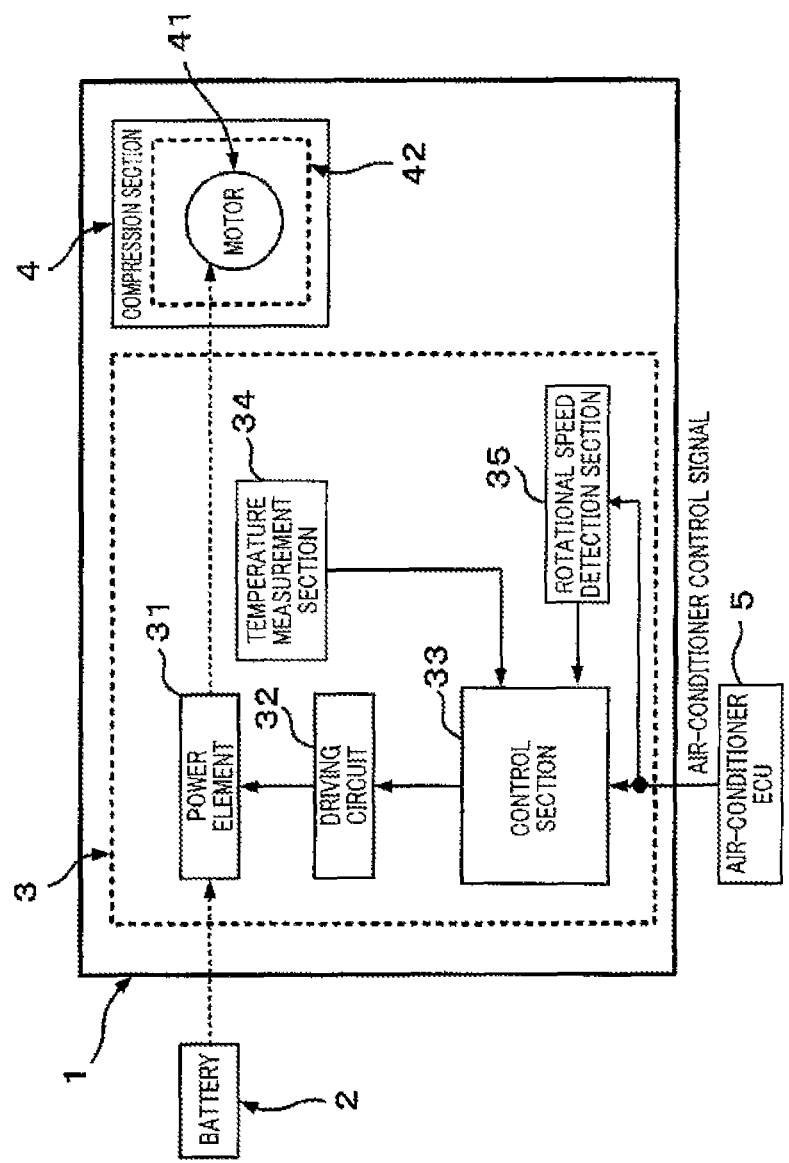
FIG. 1 is a block diagram of an electric compressor in an embodiment of the present invention.
Figure 2:
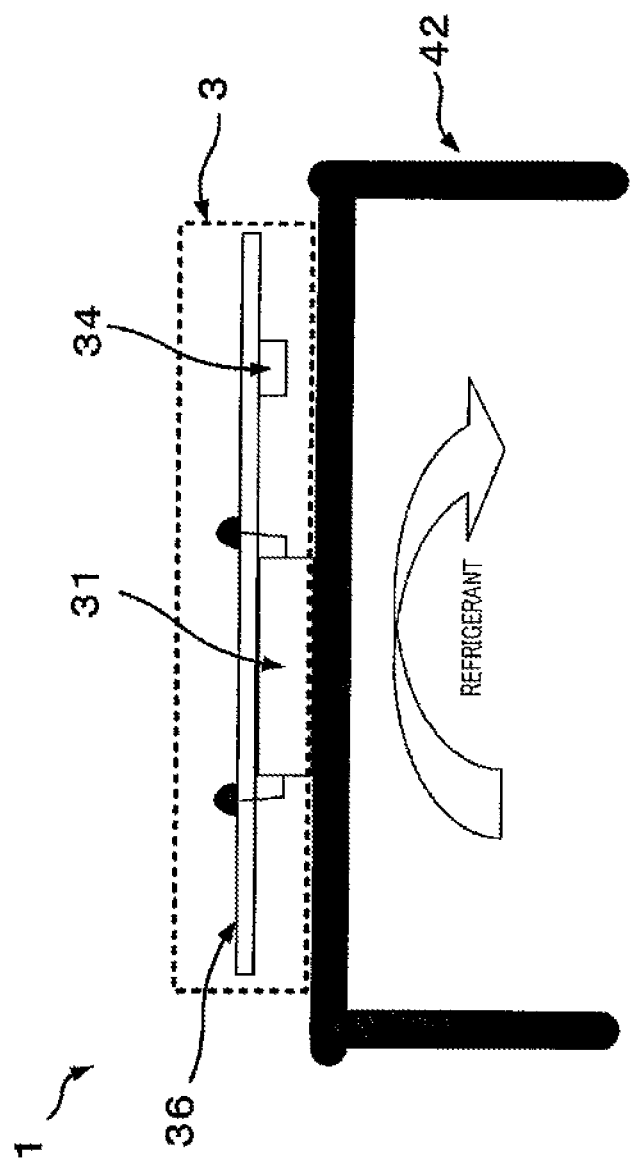
FIG. 2 is a diagram illustrating this arrangement.

Hereinafter, an electric compressor in an embodiment of the present invention will be described with reference to FIGS. 1 and 2. FIG. 1 is a block diagram of an electric compressor in the embodiment of the present invention. FIG. 2 is a layout diagram of the electric compressor. In addition, in FIG. 1, solid arrows indicate the flow of a signal, and broken arrows indicate the flow of electric power for driving a motor.

As shown in FIG. 1, the electric compressor in the present embodiment includes a mechanism for compressing the refrigerant. Electric compressor 1 is supplied with electric power from battery 2. This supply power is converted from DC to AC by inverter section 3 provided in electric compressor 1, and is transmitted to compression section 4.

Inverter section 3 includes power element 31 that converts DC power supplied from battery 2 into AC power, driving circuit 32 that drives power element 31, control section 33 that controls driving circuit 32, temperature measurement section 34 that measures the temperature of substrate 36, and rotational speed detection section 35 that detects the rotational speed of motor 41. Power element 31 and temperature measurement section 34 are disposed on substrate 36 as will be described later.

In addition, compression section 4 compresses and discharges the sucked refrigerant. Compression section 4 is configured to include motor 41 that generates the driving force to compress the refrigerant with electric power output from inverter section 3, casing 42, and a compression mechanism (not shown). Motor 41 is disposed inside casing 42. The refrigerant flowing inward through an inlet port (not shown) of casing 42 is compressed by the driving force generated by motor when passing through the inside of casing 42, and is discharged from a discharge port (not shown).

An air-conditioner control signal output from air-conditioner ECU (Electronic Control Section) 5 is input to electric compressor 1. Air-conditioner ECU 5 calculates the requested rotational speed of electric compressor 1 on the basis of the cooling temperature setting according to the occupants of the vehicle, inside and outside temperatures of the vehicle or evaporator temperature, and the like, and outputs the result as an air-conditioner control signal. This air-conditioner control signal is input to control section 33.

Hereinafter, each section will be described in detail.

Electrical energy is stored in battery 2. A secondary battery with high energy density (for example, a rechargeable nickel-metal hydride battery or a rechargeable lithium-ion battery) or a high-capacity capacitor can be used as battery 2.

Electric power stored in battery 2 is used not only as electric power to operate electric compressor 1 but also as electric power to operate a power source for driving the main motor of an electric vehicle or an auxiliary engine motor of a hybrid vehicle, accessories such as a car navigation apparatus or a car audio, or electrical components such as power windows. ETC (registered trademark), or ECU.

Next, inverter section 3 will be described in detail. Power element 31 of inverter section 3 is formed of a semiconductor element, such as an IGBT (Insulated Gate Bipolar Transistor). Power element 31 is connected to battery 2 through a smoothing capacitor (not shown). Power element 31 is mounted on substrate 36. The case of power element 31 is fixed in contact with casing 42 with heat radiation grease or the like interposed therebetween for heat radiation.

DC power supplied from battery 2 is converted into AC power by ON/OFF of power supply using power element 31, and the AC power is applied to motor 41.

Power element 31 generates heat due to its own on-resistance or switching loss occurring due to the switching operation. When a large cooling load is required, heat generation of power element 31 is also increased since the rotational speed the motor is always large. If the temperature of power element 31 exceeds an allowable value, there is a problem in that the characteristics of power element 31 may deteriorate and power element 31 may be damaged.

Driving circuit 32 of inverter section 3 is intended to drive power element 31, and is controlled by control section 33. Specifically, a control signal for ON/OFF control is input from control section 33 to driving circuit 32. DC power supplied from battery 2 is converted into AC power by ON/OFF of power supply to power element 31 on the basis of this control signal, and the AC power is applied to motor 41. As a result, control to obtain the desired rotational speed is made.

Temperature measurement section 34 is mounted at a position away from power element 31 of substrate 36, and measures the temperature of substrate 36. The measured temperature (hereinafter, referred to as "measurement temperature Ts") is transmitted to control section 33. This transmitted information is hereinafter called "temperature information". Temperature measurement section 34 is a thermistor using a resistor whose electric resistance changes with temperature changes, for example.

Rotational speed detection section 35 detects the number of revolutions per unit time SPD [rpm] of motor 41. For example, this can be implemented as follows. The information on the rotational speed detected as follows is hereinafter called "rotational speed information".

As a method of detecting the rotational speed per unit time of motor 41, there are two main methods. The first method is a method of detecting the setting value itself of the rotational speed for controlling motor 41, and the second method is a method of detecting the rotational speed by measuring the physical quantity in motor 41 itself directly.

For example, the first method detects the requested rotational speed of electric compressor 1 included in the air-conditioner control signal output from air-conditioner ECU 5. Rotational speed detection section 35 extracts the requested rotational speed of electric compressor 1 from the received air-conditioner control signal, and outputs it as the rotational speed information.

As the second method, motor current of motor 41 is detected using a sensor, an induced voltage is calculated on the basis of this result, winding resistance (characteristic value of each motor) of motor 41 determined for each motor 41, and the inductance of motor 41, and the angle of the rotor of motor 41 is estimated. Then, the rotational speed is calculated by integrating this estimate.

In addition, as another method of the second method, the rotational speed of motor 41 may also be detected directly using dedicated hardware. For example, the rotor angle of motor 41 is detected using a Hall sensor or the like, and the rotational speed is detected on the basis of the detected angle. If a dedicated device is used, the rotational speed of the motor can be more accurately detected. In this case, the calculation accuracy of estimated power element temperature Tp_est, which will be described later, is improved.

The rotational speed (rotational speed of the motor) detected using one of the methods described above is output to control section 33 as the rotational speed information.

Motor 41 is placed inside casing 42. In addition, the refrigerant passes through the inside of casing 42. Power element 31 is disposed in contact with the outside of casing 42. Here, "outside of casing 42" refers to the opposite side of space, in which motor 41 and the refrigerant are present, with casing 42 interposed therebetween.

As described above, the characteristics of power element 31 may deteriorate and power element 31 may be damaged if the temperature of power element 31 exceeds the allowable value. Therefore, as shown in FIG. 2, power element 31 mounted on substrate 36 is fixed in contact with casing 42 having good thermal conductivity, such as aluminum. In this manner, the heat of power element 31 can be released to the sucked refrigerant passing through the inside.

Control section 33 is configured to include a CPU, a ROM, a. RAM, and the like. Control section 33 controls driving circuit 32, which drives power element 31, on the basis of the requested rotational speed included in the air-conditioner control signal output from air-conditioner ECU 5.

In order to drive motor 41 with the received requested rotational speed included in the air-conditioner control signal, control section 33 generates a control signal for ON/OFF control of power element 31 and outputs it to driving circuit 32. Driving circuit 32 performs ON/OFF of power supply to power element 31 on the basis of this control signal. As a result, it becomes possible to control the rotational speed of the motor.

Moreover, in addition to this control, control section 33 has a function of estimating the temperature of power element 31 on the basis of the rotational speed information and the temperature information that have been input. The estimated temperature of power element 31 is called "estimated power element temperature Tp_est". This estimation method will be described in detail later.

In addition, control section 33 also has a function of stopping power element 31 when estimated power element temperature Tp_est is equal to or higher than the predetermined temperature (maximum operating temperature Tmax).

Figure 3:
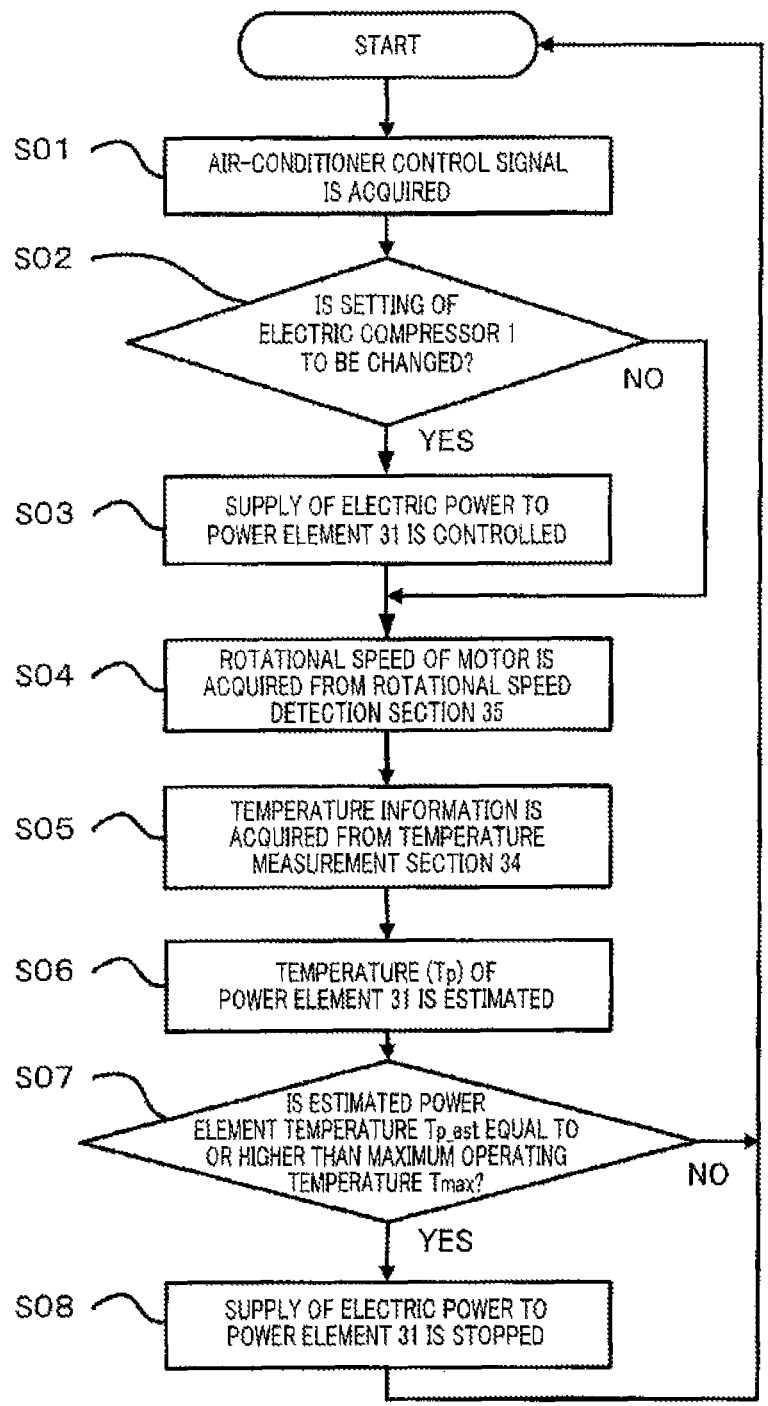
FIG. 3 is a diagram illustrating this operation.

The processing operation of the electric compressor configured as described above will be described with reference to FIG. 3. FIG. 3 is a diagram illustrating the operation in the control section of the electric compressor in the embodiment of the present invention.

When the process starts, control section 33 acquires an air-conditioner control signal (S01), and determines whether to change the setting of electric compressor 1 on the basis of the air-conditioner control signal (S02). The setting referred to herein is the rotational speed of motor 41. When the rotational speed of motor 41 is not changed (S02: NO), control section 33 proceeds to processing of S04. When the rotational speed of motor 41 is changed, control section 33 controls electric power output from power element 31 (S03).

After S03 or when NO is determined in S02, control section 33 acquires the rotational speed information of motor 41 from rotational speed detection section 35 (S04), and also acquires temperature information from temperature measurement section 34 (S05).

After S05, control section 33 estimates the temperature (estimated power element temperature Tp_est) of power element 31 on the basis of the rotational speed information and the temperature information acquired in S05 (S06). This estimation method will be described later.

After S06, control section 33 determines whether estimated power element temperature Tp_est calculated in S06 is equal to or higher than maximum operating temperature Tmax (S07).

When power element 31 reaches a high temperature (for example, a value of about 100° C.), the characteristics of power element 31 may deteriorate or power element 31 may be damaged. For this reason, when power element 31 reaches maximum operating temperature Tmax or higher (YES in S07), control section 33 stops the operation (S08: power element overheat protection operation).

In this manner, even if the temperature of power element 31 rises abruptly due to abrupt load changes, it is possible to protect power element 31 from deterioration of characteristics or damage.

In S08, control section 33 stops power element 31 by stopping the output of a control signal to driving circuit 32. The output of electric power for driving motor 41 is stopped because power element 31 is stopped.

Next, a computation equation used when control section calculates the estimated temperature (estimated power element temperature Tp_est) for actual temperature (Tp) of power element 31 in S06 will be described in detail.

Figure 4:
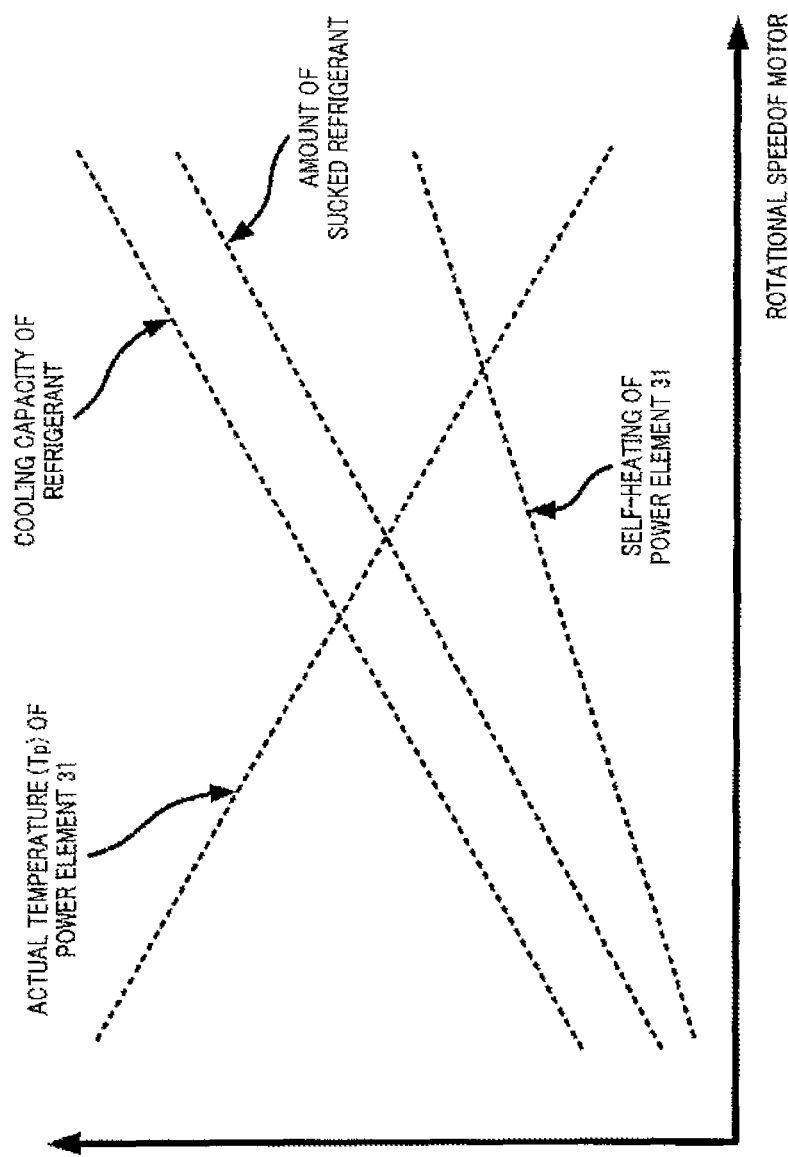
FIG. 4 is a diagram illustrating the relationship between the rotational speed of a motor and the power element temperature.
Figure 5:
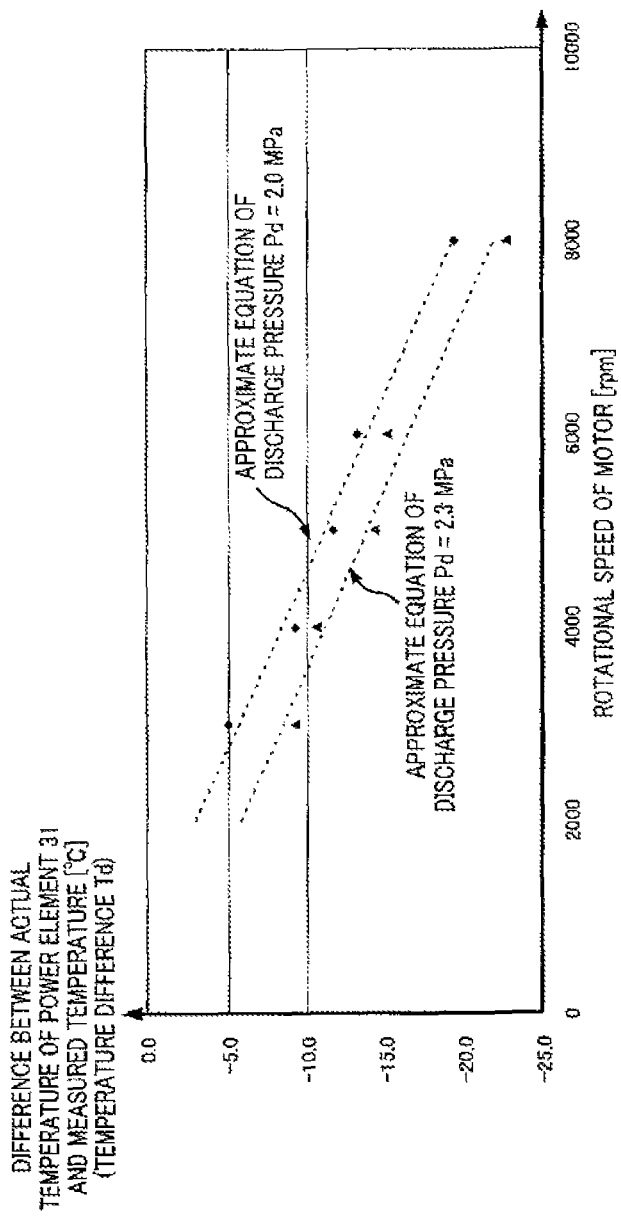
FIG. 5 is a diagram illustrating the correlation between the rotational speed of the motor and a temperature difference between the power element temperature and the detected temperature.
Figure 6:
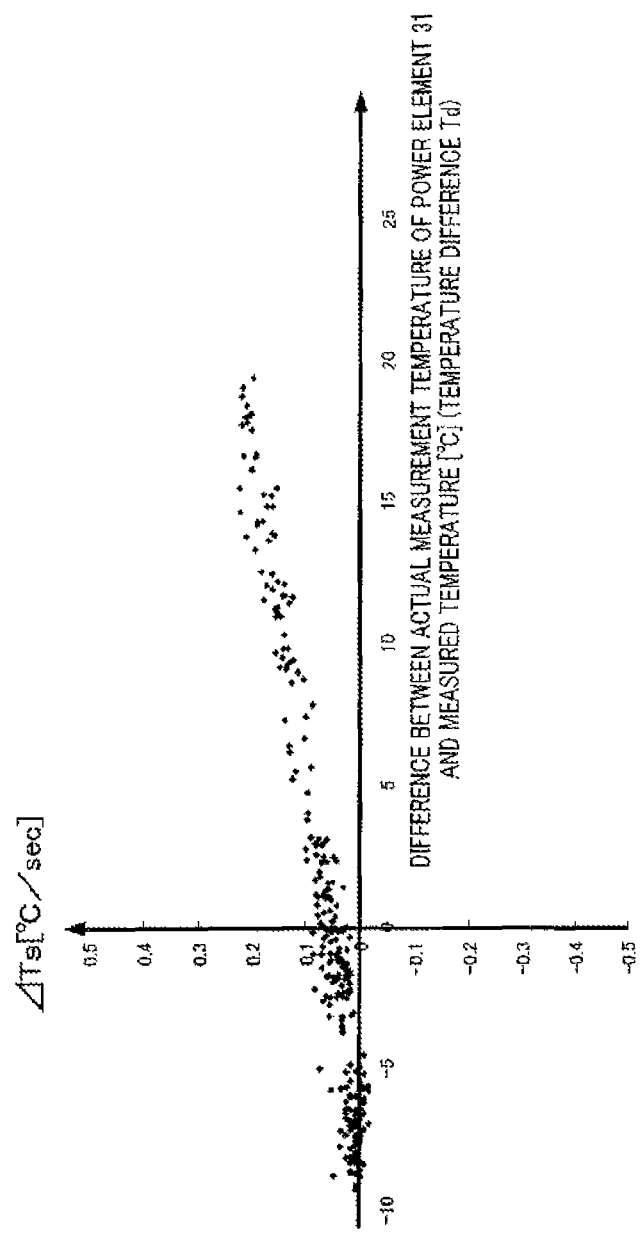
FIG. 6 is a diagram illustrating the correlation between the inclination of the detected temperature and a temperature difference between the power element temperature and the detected temperature.
Figure 7:
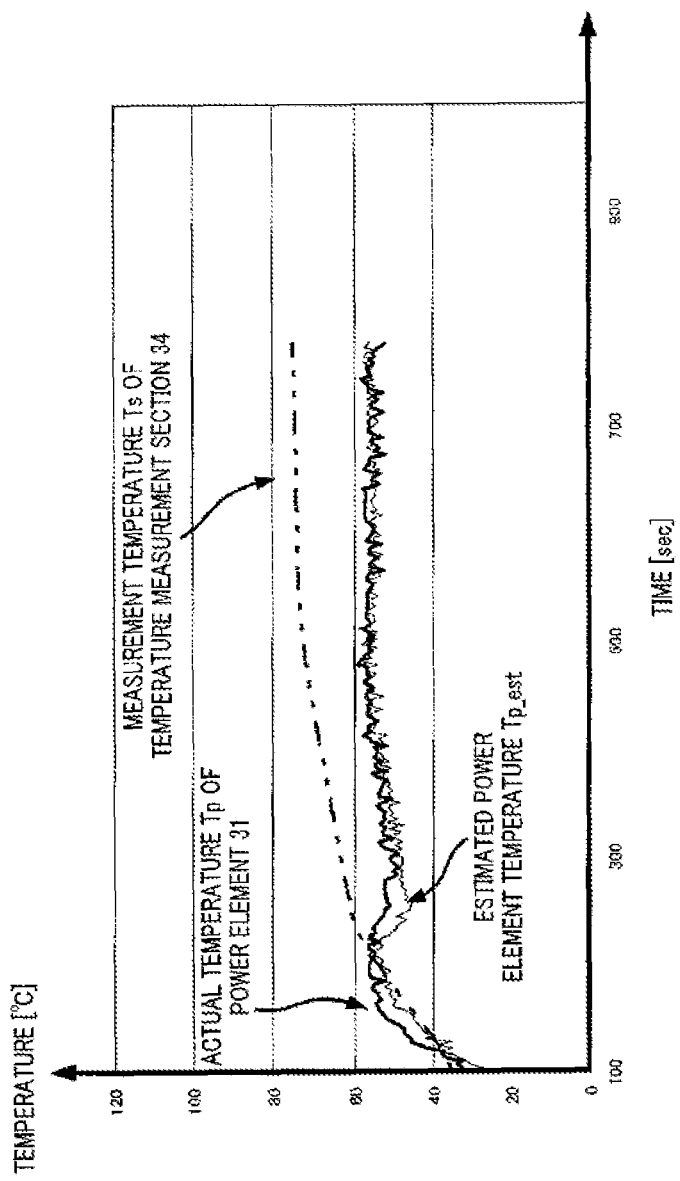
FIG. 7 is a diagram illustrating an example of the actual measurement temperature of the power element and the actual measurement value of the estimated power element temperature.

FIG. 4 is a diagram illustrating the relationship between the rotational speed of the motor and the power element temperature. In addition, FIG. 5 is a diagram illustrating the correlation between the rotational speed of the motor and a temperature difference between the power element temperature and the detected temperature. FIG. 6 is a diagram illustrating the correlation between the inclination of detected temperature and a temperature difference between the power element temperature and the detected temperature. In addition, FIG. 7 is a diagram showing an example of the actual measurement values of the power element temperature and of the estimated power element temperature.

As shown in FIG. 2, the following two causes may be considered as the cause of inconsistency of the measurement temperature of temperature measurement section 34 and actual temperature (Tp) of power element 31 when temperature measurement section 34 is disposed at the location where thermal resistance is large relative to power element 31 (substrate 36 is present between power element 31 and temperature measurement section 34).

The first cause will be described with reference to FIG. 4. In the electric compressor, the amount of sucked refrigerant (sucked refrigerant amount) also increases in proportion to an increase in the rotational speed of the motor. Accordingly, the cooling capacity of the refrigerant tends to be proportional to the rotational speed of the motor ("refrigerant cooling capacity" in FIG. 4).

On the other hand, self-heating of power element 31 occurs due to loss caused by its on-resistance or loss caused by switching. This on-resistance is constant regardless of the rotational speed of the motor, and the switching loss is proportional to the rotational speed of the motor. Accordingly, the self-heating of power element 31 is proportional to the rotational speed ("self-heating of power element 31" in FIG. 4).

Actual temperature (Tp) of power element 31 can be calculated by subtracting the amount of heat cooling based on the "refrigerant cooling capacity" from the "self-heating of power element 31". Since both the "self-heating of power element 31" and the "refrigerant cooling capacity" are proportional to the rotational speed of the motor, actual temperature (Tp) of power element 31 has a parameter proportional to the rotational speed.

However, when temperature measurement section 34 is placed at the location where thermal resistance is large relative to power element 31, the temperature response becomes slow due to the influence of the "refrigerant cooling capacity" of power element 31 described above. Therefore, it is necessary to take the rotational speed of the motor into consideration in order to calculate estimated power element temperature Tp_est.

The second cause is that dispersion of heat occurs in substrate 36 due to the large thermal resistance from power element 31 to temperature measurement section 34, and that accordingly the actual temperature (Tp) of power element 31 is not the same as measurement temperature Ts to result in the slow temperature response.

With this tendency, as the temperature change of power element 31 per unit time increases, the transient response delay of temperature measurement section 34 becomes noticeable. Assuming that the thermal resistance between power element 31 and temperature measurement section 34 is constant, there is a correlation between the temporal inclination of measurement temperature Ts of temperature measurement section 34 and a temperature difference (temperature difference Td) between measurement temperature Ts and actual temperature of power element 31. Therefore, is necessary to take this correlation into consideration in order to calculate estimated power element temperature Tp_est.

Based on the two causes described above, control section 33 calculates estimated power element temperature Tp_est according to equation 1 below.

$$Tp\_est = Ts + \alpha SPD + \beta^* \Delta Ts \quad \text{(Equation 1)}$$

Here, $\alpha$ [° C./rpm] is a correction coefficient of the rotational speed of a motor, $\beta$ [° C./(° C./sec)] is a correction coefficient of transient response, and $\Delta Ts$ [° C./sec] is a temperature change per unit time of measurement temperature Ts.

Coefficients $\alpha$ and $\beta$ in equation 1 will be described later.

The usefulness of equation 1 above is shown on the basis of the experimental data of FIGS. 5 and 6.

FIG. 5 is a graph showing the relationship between the rotational speed of the motor and temperature difference Td (temperature difference when the actual temperature of power element 31 reaches a plateau due to continuous operation at the rotational speed of the motor). The sensor temperature was measured with a thermistor mounted on substrate 36, and actual temperature (Tp) of power element 31 was measured with a thermocouple fixed to the surface of the power element. In addition, discharge pressure Pd was set to 2.0 MPa and 2.3 MPa, As shown in FIG. 5, temperature difference Td tends to decrease in proportion to an increase in the rotational speed of the motor. That is, as the rotational speed of the motor increases, the temperature difference between measurement temperature Ts and the actual temperature of power element 31 increases.

By considering the approximate equation such as the broken line in FIG. 5, correction coefficient $\alpha$ of the rotational speed of the motor in equation 1 can be set to −0.0027, for example.

Thus, control section 33 estimates the temperature of power element 31 by subtracting a value, which increases with an increase in the rotational speed of the motor detected by rotational speed detection section 35, from measurement temperature Ts measured by temperature measurement section 34 as shown in equation 1. As a result, the temperature response is improved.

FIG. 6 is a graph showing the relationship between temperature difference Td (temperature difference when the actual temperature of power element 31 reaches a plateau due to continuous operation at the rotational speed of the motor) and $\Delta Ts$ (temperature change per unit time of measurement temperature Ts). FIG. 6 is data when an operation was performed with a fixed rotational speed of the motor.

As shown in FIG. 6, temperature change $\Delta Ts$ increases as temperature difference Td increases. That is, it is possible to confirm the correlation in which the response delay of measurement temperature Ts increases as temperature change $\Delta Ts$ increases. By replacing the data with an approximate equation, transient response correction coefficient $\beta$ in equation 1 can be set to, for example, 100.

The heat emitted from power element 31 is transmitted to temperature measurement section 34 through substrate 36 that diffuses this heat. Since substrate 36 diffuses the heat, the temperature measured by temperature measurement section 34 is different from the actual temperature of power element 31, and a delay is caused by the time of heat transfer through the substrate.

In such an arrangement, if a power element overheat protection operation is performed on the basis of the temperature measured by temperature measurement section 34, it is not possible to follow an abrupt increase in the temperature of power element 31 due to the time of heat transfer through substrate 36. As a result, the characteristics of power element 31 may deteriorate, or power element 31 may be damaged.

Therefore, control section 33 calculates estimated power element temperature Tp_est by adding a value, which is proportional to a temperature change (temperature change $\Delta Ts$) at the predetermined time of measurement temperature Ts measured by temperature measurement section 34, to measurement temperature Ts measured by temperature measurement section 34 as shown in equation 1. Since the temperature response is improved in this manner, deterioration of characteristics or damage of power element 31 can be prevented.

Finally, the difference between the actual measurement temperature and the estimated temperature of power element 31 calculated by equation 1 is verified using FIG. 7. As shown in FIG. 7, measurement temperature Ts of temperature measurement section 34 has poor followability to actual temperature Tp of power element 31 at time of 100 to 300 sec. In addition, measurement temperature Ts of temperature measurement section 34 reaches a plateau state after time of 500 sec, but actual temperature Tp of power element 31 reaches a plateau near the time of about 150 sec. Accordingly, the plateauing temperature is shifted.

On the other hand, followability of estimated power element temperature Tp_est shows the improved transient response to actual temperature Tp of power element 31. Also for the plateauing temperature, values appropriately equal to the plateauing temperature of actual temperature Tp of power element 31 are taken. Therefore, the effect of temperature estimation according to the present invention can be confirmed.

As shown in FIG. 7, there is large error between measurement temperature is measured by temperature measurement section 34 and actual temperature Tp. For this reason, the temperature to stop the supply of electric power to power element 31 should be set with a considerable margin. As a result, since a temperature range where electric compressor 1 can operate is narrowed, desired air-conditioning may not be achieved.

On the other hand, as shown in FIG. 7, there is small error between estimated power element temperature Tp_est and actual temperature Tp. For this reason, it is possible to reduce the margin of the temperature to stop the supply of electric power to power element 31. As a result, since a wide temperature range where electric compressor 1 can operate is secured, desired air-conditioning can be reliably achieved.

As described above, electric compressor 1 in the embodiment of the present invention estimates the temperature of power element 31 on the basis of the rotational speed of motor 41 detected by rotational speed detection section 35 and the temperature measured by temperature measurement section 34.

The rotational speed of motor 41 is directly related to the flow rate of the refrigerant. Therefore, the influence of the refrigerant can be reduced by correcting the temperature measured by temperature measurement section 34 with the rotational speed of motor 41 detected by rotational speed detection section 35.

From the above, there is an effect that the change in temperature of power element 31 can be followed even if temperature measurement section 34 is disposed away from power element 31.

The disclosure of Japanese Patent Application No. 2010-223760, filed on Oct. 1, 2010, including the specification, drawings and abstract, is incorporated herein by reference in its entirety.

INDUSTRIAL APPLICABILITY

The present invention is useful as an electric compressor, which compresses a refrigerant, and the like.

REFERENCE SIGNS LIST

1 Electric compressor
2 Battery
3 inverter section
4 Compression section
5 Air-conditioner ECU
31 Power element
32 Driving circuit
33 Control section
34 Temperature measurement section
35 Rotational speed detection section
36 Substrate
41 Motor
42 Casing

The invention claimed is:

1. An electric compressor comprising:
a motor that generates a driving force to compress a refrigerant;
a power element that drives the motor;
a temperature measurement section that measures a temperature of a substrate on which the power element is disposed;
a rotational speed detection section that detects the rotational speed of the motor; and
a control section that estimates a temperature of the power element,
wherein the control section estimates the temperature of the power element on the basis of the rotational speed of the motor detected by the rotational speed detection section and the temperature measured by the temperature measurement section.

2. The electric compressor according to claim 1, wherein:
the control section further adjusts electric power output from the power element, and stops the power element when the estimated temperature of the power element is equal to or higher than a predetermined temperature.

3. The electric compressor according to claim 1, wherein:
the motor is disposed inside a casing;
the refrigerant passes through an inside of the casing; and
the power element is disposed in contact with an outside of the casing.

4. The electric compressor according to claim 1, wherein:
the control section estimates the temperature of the power element by subtracting a value, which increases with an increase in the rotational speed of the motor detected by the rotational speed detection section, from the temperature measured by the temperature measurement section.

5. The electric compressor according to claim 1, wherein:
the control section estimates the temperature of the power element by adding a value, which is proportional to a temperature change at a predetermined time of the temperature measured by the temperature measurement section, to the temperature measured by the temperature measurement section.

* * * * *